US008995768B2

(12) United States Patent
Qiu et al.

(10) Patent No.: US 8,995,768 B2
(45) Date of Patent: Mar. 31, 2015

(54) METHODS AND DEVICES FOR PROCESSING SCANNED BOOK'S DATA

(71) Applicants: Peking University Founder Group Co., Ltd., Beijing (CN); Beijing Founder Apabi Technology Ltd., Beijing (CN)

(72) Inventors: Ruiheng Qiu, Beijing (CN); Yun Li, Beijing (CN)

(73) Assignees: Peking University Founder Group Co., Ltd., Beijing (CN); Beijing Founder Apabi Technology Ltd., Beijing (CN)

( * ) Notice: Subject to any disclaimer, the term of this patent is extended or adjusted under 35 U.S.C. 154(b) by 153 days.

(21) Appl. No.: 13/730,387

(22) Filed: Dec. 28, 2012

(65) Prior Publication Data
US 2013/0170751 A1 Jul. 4, 2013

(30) Foreign Application Priority Data
Dec. 28, 2011 (CN) .......................... 2011 1 0448225

(51) Int. Cl.
G06K 9/18 (2006.01)
G06K 9/34 (2006.01)
G06K 9/36 (2006.01)
G06K 9/00 (2006.01)
H04N 1/411 (2006.01)

(52) U.S. Cl.
CPC .............. *G06K 9/36* (2013.01); *G06K 9/00442* (2013.01); *H04N 1/4115* (2013.01)
USPC .......................................... 382/177; 382/182

(58) Field of Classification Search
USPC ................... 382/177, 182; 715/272
See application file for complete search history.

(56) References Cited

U.S. PATENT DOCUMENTS

| | | | | | |
|---|---|---|---|---|---|
| 5,373,566 | A | * | 12/1994 | Murdock ....................... | 382/156 |
| 5,577,135 | A | * | 11/1996 | Grajski et al. ................ | 382/253 |
| 5,825,919 | A | * | 10/1998 | Bloomberg et al. .......... | 382/177 |
| 5,999,647 | A | * | 12/1999 | Nakao et al. .................. | 382/187 |
| 6,188,790 | B1 | * | 2/2001 | Yoshikawa et al. ........... | 382/194 |
| 6,249,605 | B1 | * | 6/2001 | Mao et al. ..................... | 382/186 |
| 6,487,311 | B1 | * | 11/2002 | Gal et al. ...................... | 382/225 |
| 6,636,631 | B2 | * | 10/2003 | Miyazaki et al. ............. | 382/187 |
| 6,681,044 | B1 | * | 1/2004 | Ma et al. ....................... | 382/185 |
| 6,721,451 | B1 | * | 4/2004 | Ishitani ......................... | 382/181 |
| 2008/0319989 | A1 | * | 12/2008 | Ikeda et al. ....................... | 707/5 |
| 2009/0202151 | A1 | * | 8/2009 | Tabata .......................... | 382/177 |
| 2009/0316991 | A1 | * | 12/2009 | Geva et al. .................... | 382/176 |
| 2011/0194770 | A1 | * | 8/2011 | Kim et al. ..................... | 382/176 |

OTHER PUBLICATIONS

Ha et al. ("Document Page Decomposition by the Bounding-Box Projection Technique," Proceedings of the Third International Conference on Document Analysis and Recognition (1995), vol. 2, pp. 1119-1122).*

Mitchell et al. ("Document page segmentation based on pattern spread analysis," Optical Engineering, vol. 39, No. 3, Mar. 2000, pp. 724-734).*

Mitchell et al. ("Document layout extraction using soft ordering," Optical Engineering, vol. 41, No. 11, Nov 2002, pp. 2831-2843).*

* cited by examiner

*Primary Examiner* — Yubin Hung
(74) *Attorney, Agent, or Firm* — Finnegan, Henderson, Farabow, Garrett & Dunner, LLP

(57) ABSTRACT

A method for processing data of a scanned book having a plurality of pages is disclosed. The method includes obtaining page image data from a page. The method further includes segmenting and recognizing the page image data to obtain locations of rectangular boxes corresponding to the respective characters and text codes for the respective characters. The method also includes obtaining respective aggregated character line information for each line of characters. The method further includes adjusting the rectangular boxes in accordance with the obtained aggregated character line information.

14 Claims, 6 Drawing Sheets

以防你还不知道goo-goo，我先来解释一下，goo-goo是描述某种"善政"类型的古老术语，形容反对腐败及纳党偏私的改革者。富兰克林·罗斯福就是一个杰出的goo-goo，他使政府更加健全的同时更加廉洁。奥巴马也要这样做。

Fig. 4A goo-goo. goo-

Fig. 4B

以防你还不知道goo-goo，我先来解释一下，goo-

Fig. 4C

| Character Image | Unique Number |
|---|---|
| | 31 |
| | 32 |
| | 33 |
| | 34 |
| | 35 |

Fig. 5

| Location of Rectangular Box | Character for Text Code | Unique Number for Group |
|---|---|---|
| ... | ... | ... |
| (100,70) | 道 | 31 |
| (110,70) | g | 32 |
| (118,70) | o | 33 |
| (125,70) | o | 33 |
| (132,70) | ― | 34 |
| (138,70) | g | 35 |
| (145,70) | o | 33 |
| (151,70) | o | 33 |
| ... | ... | ... |

ND DEVICES FOR PROCESSING
METHODS AND DEVICES FOR PROCESSING SCANNED BOOK'S DATA

CROSS REFERENCE OF RELATED APPLICATIONS

This application claims the benefit of Chinese patent application No. 201110448225.X, filed on Dec. 28, 2011, which is incorporated by reference in its entirety as part of this application.

TECHNICAL FIELD

The disclosure relates to a digital typesetting technique, in particular, to apparatuses and methods for processing data of scanned book.

BACKGROUND

A "scanned book" is an electronic book obtained through scanning a paper book using a scanner or the like. Each page of the scanned book corresponds a scanned image with higher DPI (Dot Per Inch). The amount of data needed to represent a scanned image is usually large, and thus, it is challenging to store and transmit the scan data. Moreover, data of the scanned pages may not be readily utilized, for example, for text copying, layout organizing of the documents, etc.

To enable text copying, a double-layer page technology has been proposed, in which a transparent layer is overlaid on the scanned image, and transparent words or characters obtained using OCR (Optical Character Recognition) are overlaid on corresponding locations of the transparent layer. As a result, the transparent words or characters can be copied without impacting the original page structure of the scanned book.

Although this method may enable text copying from a scanned book, the words or characters on the transparent layer can still not be used for more advanced applications such as changing the layout. As a result, a large amount of data in the scanned books still cannot be re-arranged. Accordingly, there is a need for a method and an apparatus for processing the data of the scanned book, to allow re-arrangement of the layout of the scanned book.

SUMMARY

In one aspect, a method for processing data of a scanned book having a plurality of pages is disclosed. The method includes obtaining page image data from a page. The method further includes segmenting and recognizing the page image data to obtain locations of boxes corresponding to the respective characters and text codes for the respective characters. The method also includes aggregating each line of characters to obtain respective aggregated character line information for each line of characters. The method further includes adjusting the boxes in accordance with the obtained aggregated character line information, thus obtaining precise locations of the boxes for the respective characters.

In another aspect, an apparatus for processing a data of a scanned book having a plurality of pages is disclosed. The apparatus may include a processor and a storage device. The processor may be configured to obtain page image data from a page. The processor may be further configured to segment and recognize the page image data to obtain locations of rectangular boxes corresponding to the respective characters and text codes for the respective characters. The processor may also be configured to aggregate each line of characters to obtain respective aggregated character line information for each line of characters. The processor may yet further be configured to adjust the rectangular boxes in accordance with the obtained aggregated character line information, thus obtaining precise locations of the boxes for the respective characters. The storage device may be configured to store the page image data.

The method may further include classifying the character images on the page into a plurality of groups using the pixel data of the respective characters such that character images with similar visual appearance are assigned to a same group. The method may also include assigning a unique number to each group of character images, and storing the precise locations of the boxes, the text codes of the respective characters and the unique numbers assigned to the groups. The method may then include deleting the groups of character images from the page, and compressing the page after the deletion to obtain a compressed document.

Since the precise locations of the boxes, the aggregated character line information, and the text codes for the respective characters are obtained and stored, the necessary information can be readily provided for the subsequent re-typesetting. As a result, the disclosed methods and apparatuses may be used to assist re-typesetting the layout of the scanned book.

Furthermore, by classifying the character images and removing them from the pages before the pages are compressed, the disclosed methods and apparatus may reduce the amount of data to be processed and stored for the scanned book. Also, since the precise locations of the boxes, text codes of the characters, and unique numbers of the groups are stored and compressed separately, the original document may be later restored.

BRIEF DESCRIPTION OF THE DRAWING

Exemplary non-limiting embodiments of the invention are described below with reference to the attached figures. The drawings are illustrative and generally not to an exact scale. The same or similar elements on different figures are referenced using the same reference numbers.

FIG. 4A shows an exemplary page of a scanned book, consistent with some disclosed embodiments;

FIG. 4B shows the first line, of the page shown in FIG. 4A being segmented and recognized, consistent with some disclosed embodiments;

FIG. 4C shows the first line of the page shown in FIG. 4A, after the rectangular boxes are adjusted, consistent with some disclosed embodiments;

FIG. 5 shows exemplary groups of character images and respective unique numbers assigned to the groups, consistent with some disclosed embodiments;

DETAILED DESCRIPTION

Figure 1:
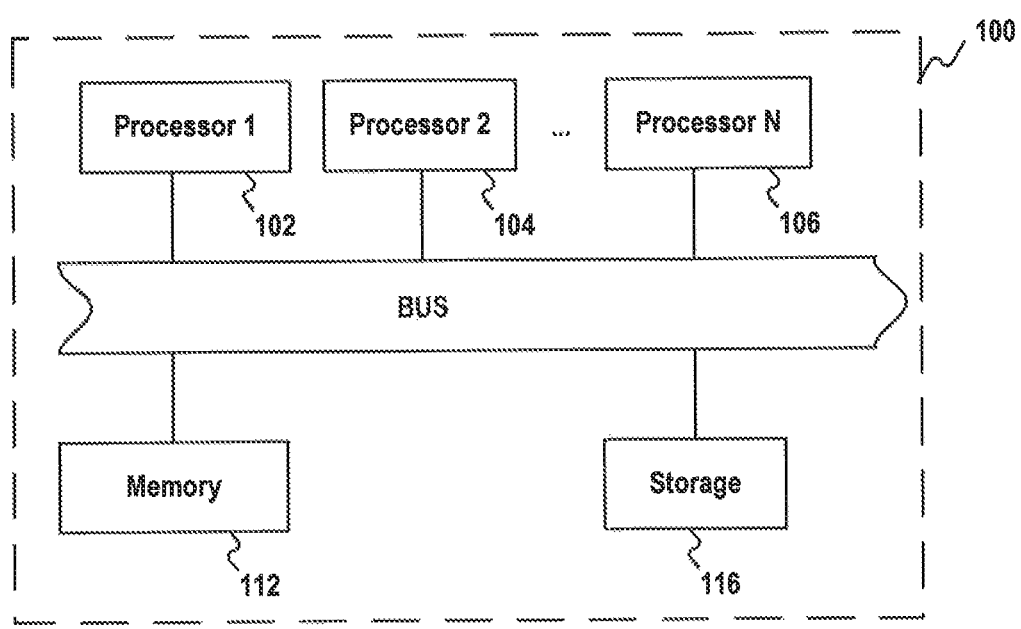
FIG. 1 is a schematic diagram illustrating a scan data processing apparatus, consistent with some disclosed embodiments.

Reference will now be made in detail to exemplary embodiments, examples of which are illustrated in the accompanying drawings. When appropriate, the same reference numbers are used throughout the drawings to refer to the same or like parts. FIG. 1 is a schematic diagram illustrating a scan data processing apparatus 100, consistent with some disclosed embodiments.

Apparatus 100 may include a general purpose computer, a computer cluster, a mainstream computer, a computing device dedicated for providing online contents, or a computer network comprising a group of computers operating in a centralized or distributed fashion. As shown in FIG. 1, system 100 may include one or more processors (processors 102, 104, 106 etc.), a memory 112, a storage device 116, a communication interface 114, and a bus to facilitate information exchange among various components of system 100. Processors 102-106 may include a central processing unit ("CPU"), a graphic processing unit ("GPU"), or other suitable information processing devices. Depending on the type of hardware being used, processors 102-106 can include one or more printed circuit boards, and/or one or more microprocessor chips. Processors 102-106 can execute sequences of computer program instructions to perform various methods that will be explained in greater detail below.

Memory 112 can include, among other things, a random access memory ("RAM") and a read-only memory ("ROM"). Computer program instructions can be stored, accessed, and read from memory 112 for execution by one or more of processors 102-106. For example, memory 112 may store one or more software applications. Further, memory 112 may store an entire software application or only a part of a software application that is executable by one or more of processors 102-106. It is noted that although only one block is shown in FIG. 1, memory 112 may include multiple physical devices installed on a central computing device or on different computing devices.

In some embodiments, storage device 116 may be provided to store a large amount of data, such as databases containing data of a scanned book, image information of the scanned book, layout information of the scanned book, etc. Storage device 116 may also store software applications that are executable by one or more processors 102-106. Storage device 116 may include one or more magnetic storage media such as hard drive disks; one or more optical storage media such as computer disks (CDs), CD-Rs, CD±RWs, DVDs, DVD±Rs, DVD±RWs, HD-DVDs, Blu-ray DVDs; one or more semiconductor storage media such as flash drives, SD cards, memory sticks; or any other suitable computer readable media.

Figure 2:
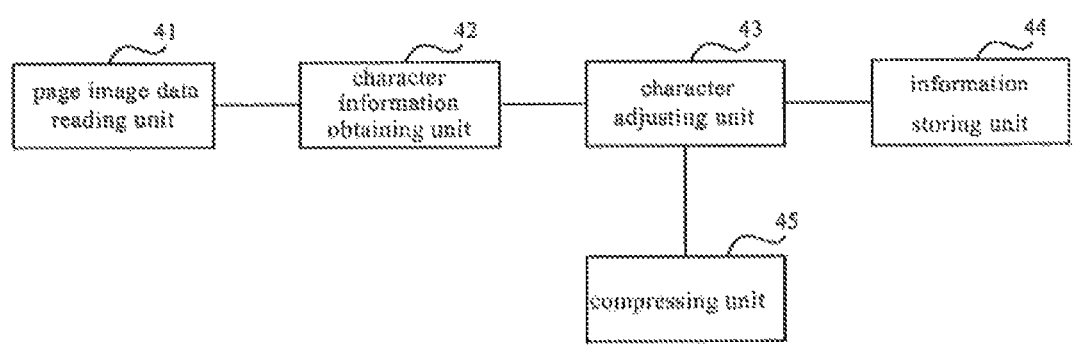
FIG. 2 is a block diagram showing various modules of a scan data processing apparatus for processing data of a scanned book, consistent with some disclosed embodiments.

Embodiments consistent with the present disclosure provide methods, systems, apparatuses, and computer readable media for processing data of a scanned book. FIG. 2 is a block diagram showing various modules of scan data processing apparatus 100 for processing data of a scanned book, consistent with some disclosed embodiments.

In some embodiments, apparatus 100 may include a page image data reading unit 41 configured to read page image data in each page of the scanned book. Apparatus 100 may further include a character information obtaining unit 42 configured to segment and recognize the page image data to obtain locations of boxes, such as rectangular boxes, corresponding to respective characters. Character information obtaining unit 42 may be further configured to obtain a text code for each character.

Apparatus 100 may also include a character adjusting unit 43 configured to aggregate each line of characters in each page to obtain respective aggregated character line information for each line of characters. Character adjusting unit 43 may be further configured to adjust the rectangular boxes in accordance with the obtained aggregated character line information, in order to obtain precise locations of the rectangular boxes for the respective characters.

In some embodiments, character adjusting unit 43 may be configured to amend the rectangular boxes by first determining the height of each line of characters in accordance with the aggregated character line information; and then adjusting the rectangular box of each character to have the same height as the line height of the corresponding line.

Apparatus 100 may further include an information storing unit 44 configured to store the obtained precise locations of the rectangular boxes for the respective characters, the aggregated character line information, and the text codes of the characters.

In some embodiments, and optionally, apparatus 100 may also include a compressing unit 45. After the rectangular boxes for the characters are adjusted by character adjusting unit 43, compressing unit 45 may classify the character images on each page into a plurality of groups using the pixel data of these characters such that character images with similar visual appearance are assigned to a same group. In some alternative embodiments, instead of classifying the character images on each page, compressing unit 45 may classify all the character images in a scanned book, which may include a plurality of pages.

In some embodiments, each group of character images may be assigned with a unique number. The unique numbers for these groups, along with the precise locations of the rectangular boxes and the text codes for the characters, may be stored. Compressing unit 45 may then delete the groups of character images from the page, and compress the page without the character images to obtain a compressed document. The compressed document may then be stored.

Figure 3:
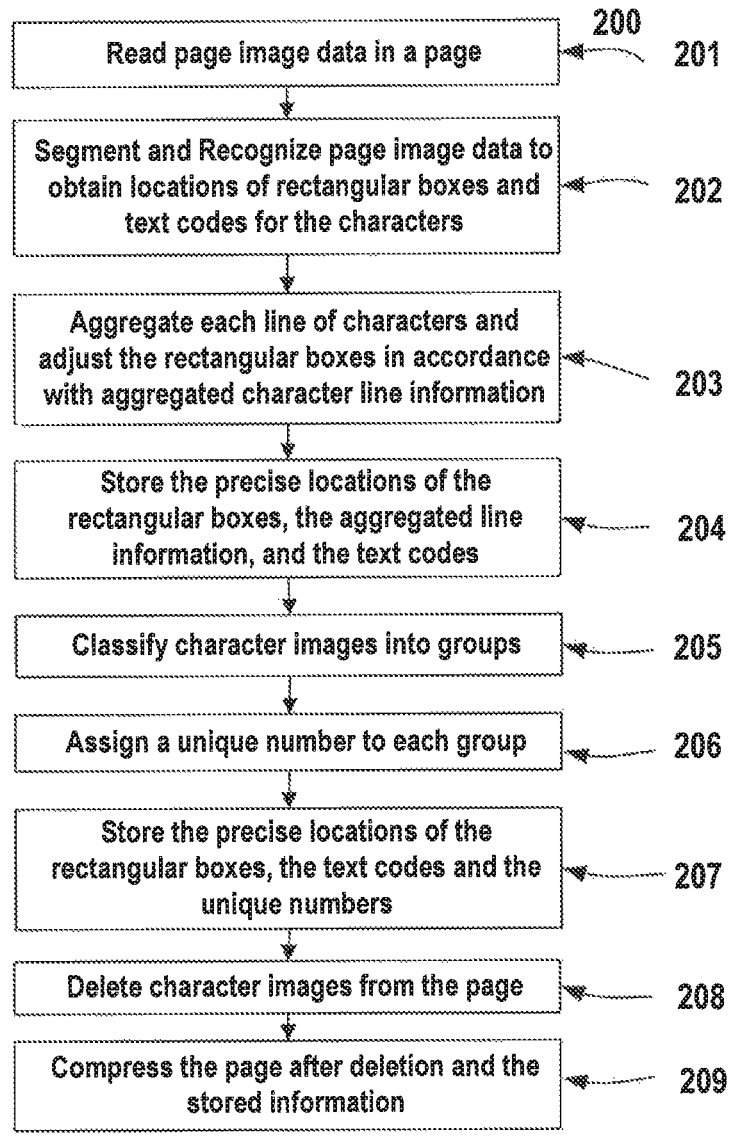
FIG. 3 shows a flow chart of a method for processing data of a scanned book, consistent with some disclosed embodiments.

FIG. 3 shows a flow chart of a method for processing data of a scanned book, consistent with some disclosed embodiments. In FIG. 3, process 200 comprises a series of steps that may be performed by one or more of processors 102-106 of apparatus 100 to implement a data processing operation initiated by a user. In some embodiments, process 200 may be performed for each page of an electronic document, such as a scanned book. FIG. 4A shows an exemplary page of a scanned book. Descriptions of an exemplary process 200 will be made in connection with the page of FIG. 4A.

In Step 201, apparatus 100 may read page image data in each page. For example, the page image data related to the page shown on FIG. 4A may be read by page image data reading unit 41. In Step 202, apparatus 100 may segment and recognize the page image data to obtain locations of rectangular boxes corresponding to respective characters. In some embodiments, the page image data may be segmented and recognized using Optical Character Recognition (OCR). In some embodiments, apparatus 100 may further obtain a text code for each character, as part of Step 202. For example, the text code is determined based on the Unicode.

For example, FIG. 4B shows the first line of the page shown in FIG. 4A being segmented and recognized. Rectangular boxes are shown surrounding each character or letter of the first line. Each of the rectangular boxes represents one character or letter segmented from the page, and the characters shown above the first line are the characters corresponding to the respective text codes. As shown in FIG. 4B, the sizes of the rectangular boxes may be different from each other. Also, some characters may be mis-identified. For example, a horizontal line may be mistakenly identified as a Chinese character "-", and a comma "," may be mistakenly identified as a period ".", etc. These mis-identified characters may impact the accuracy when re-typesetting the layout of the document.

In Step 203, apparatus 100 may aggregate each line of characters to obtain aggregated character line information. In some embodiments, the aggregated character line information may include the location of the character line in the document, sizes and orders of respective characters in the character line, and the height of the character line, etc. In some embodiments, the aggregated character line information may further include information on characters. Such information may include pixel data for each character, outline for each character, cutting accuracy for each character, and the location of each character in the character line, etc.

As part of Step 203, apparatus 100 may further adjust the rectangular boxes in accordance with the obtained aggregated character line information, in order to obtain precise locations of the rectangular boxes for the respective characters. In some embodiments, apparatus may first determine the height of each line of characters in accordance with the aggregated character line information; and then adjust the rectangular box of each character to have the same height as that of respective line height of the each line.

For example, FIG. 4C shows the first line of the page shown in FIG. 4A, after the rectangular boxes are adjusted. After the adjustment, the rectangular boxes in the first line have the same height as each other, as opposed to FIG. 4B.

In some embodiments, to avoid a potential issue during re-typesetting caused by line-wrap or splice-line, in Step 203, apparatus 100 may further adjust the height of rectangular boxes for each character line based on the heights of the rectangular boxes in both the previous line and the subsequent line.

In Step 204, the precise locations of the rectangular boxes, along with the aggregated character line information and the text codes for the characters, may be stored, e.g., in storage 116.

In some embodiment, processor 200 may optionally include Steps 205-209, to reduce the amount of image data used to represent the scanned book. Steps 205-209 may take place after the rectangular boxes of all characters on each page of the scanned book have been adjusted. In Step 205, apparatus 100 may classify the character images on each page into a plurality of groups using the pixel data of these characters. For example, character images with similar visual appearance may be grouped together, based on factors such as the pixel data, shape, color of respective characters, etc. In some alternative embodiments, instead of classifying the character images on each page, apparatus 100 may classify all the character images in the scanned book.

For example, for the page shown in FIG. 4A, each character "o" may be classified as a group. Since the upper right corner of the first character "g" is flat, and the upper right corner of the second character "g" is inclined, they may not be classified as the same group due to this significant difference.

In Step 206, each group of character images may be assigned a unique number. In some embodiments, for each group, a character image may be determined as a representative image for this group. In some embodiments, since the differences among the character images in each group are not visually noticeable, any character image in the group may be selected as the representative image. Other methods may also be used to determine the representative image. For example, a mean value may be calculated based on the pixel values of the character images in the group, and the character image having a pixel value equal to the mean value of pixels may be determined as the representative. Alternatively, the character images in the group may be sorted based on a partial order function, and the character image in the middle may be determined as the representative.

For example, for the first line as shown in FIG. 4C, FIG. 5 shows the groups and respective unique numbers that may be obtained. As shown, the representative images of the five groups are listed on the left-hand side, and the corresponding unique numbers assigned to the groups are listed on the right-hand side. In some embodiments, the character images within a same group may be replaced by the representative character image to reduce the size of data stored for the page.

Figures 6, 7:
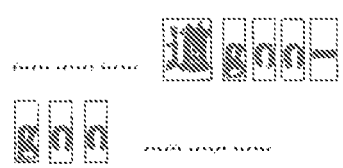
FIG. 6 shows an exemplary look-up table storing precise locations of the rectangular boxes and the text codes for the characters, as well as the unique numbers of the corresponding groups, consistent with some disclosed embodiments.
FIG. 7 shows an exemplary re-typesetted document, consistent with some disclosed embodiments.

In Step 207, apparatus 100 may store the precise locations of the rectangular boxes and the text codes for the characters, as well as the unique numbers of the corresponding groups. In some embodiments, such information may be saved in a look-up table, as shown in FIG. 6. For example, the first column of the look-up table shown in FIG. 6 stores the precise coordinates of the rectangular boxes. The second column stores the characters corresponding to the identified text codes. The third column stores the unique number of the respective groups that the characters are classified in.

In Step 208, apparatus 100 may delete the character images from the page to obtain a page that contains a large portion of blank space and only a small portion of residual data. In Step 209, apparatus 100 may compress and store the page and the look-up table as shown in FIG. 6. Conventional compression methods may be applied in Step 209. In some embodiments, since there is only a small amount of information left on the page being compressed, a higher compression ratio may be used. For example, the compression ratio may be up to ten times.

Furthermore, through character image classification and compression as performed in Steps 205-209, process 200 may reduce the amount of image data used to represent the scanned book, without losing any information in the original document.

In some embodiments, when restoring the scanned book from stored data apparatus 100 may first decompress the data to obtain each blank page, and the look-up table that stores the character images, the precise locations of the rectangular boxes of the respective characters, the text codes of the respective characters, and the unique numbers assigned to the groups of the character images. Then, each character image may be placed on the page according to the precise locations of the rectangular boxes of the respective characters.

In some embodiments, when a user selects a certain region of the page and wants to copy the characters in that region, apparatus 100 may first identify the character image within the region selected by the user. Apparatus 100 may then determine the text codes of characters corresponding to the identified character images. Apparatus 100 may sort the text codes in the same order of the character images, and return the sorted text codes to the user.

In some embodiments, when re-typesetting the layout of the document, the stored aggregated character line information of each character in the document may be input to a typesetting engine. The typesetting engine may then perform a typesetting operation based on the width of the page of document and the aggregated character line information. For example, FIG. 7 shows two re-typesetted lines of the first line as shown in FIG. 4A.

The embodiments of the present invention may be implemented using certain hardware, software, or a combination thereof. In addition, the embodiments of the present invention may be adapted to a computer program product embodied on one or more computer readable storage media (comprising but not limited to disk storage, CD-ROM, optical memory and the like) containing computer program codes.

In the foregoing descriptions, various aspects, steps, or components are grouped together in a single embodiment for purposes of illustrations. The disclosure is not to be interpreted as requiring all of the disclosed variations for the claimed subject matter. The following claims are incorporated into this Description of the Exemplary Embodiments, with each claim standing on its own as a separate embodiment of the disclosure.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. A method for processing data of a scanned book comprising a plurality of pages, the method comprising:
   obtaining page image data from a page;
   segmenting and recognizing the page image data to obtain locations of boxes corresponding to respective characters and text codes for the respective characters;
   obtaining aggregated character line information for a line of characters; and
   adjusting the boxes in accordance with the obtained aggregated character line information;
   wherein the adjusting comprises:
      determining the height of the line of characters in accordance with the aggregated character line information;
      adjusting the box of each character to have the same height as the determined height of the line of characters; and
      adjusting the height of the line of characters based on heights of both a previous line and a subsequent line.

2. The method according to claim 1, further comprising:
   storing the locations of the boxes, the aggregated character line information, and the text codes.

3. The method according to claim 1, the method further comprises:
   classifying the character images on the page into a plurality of groups using pixel data of the respective characters such that character images with the same visual appearance are assigned to a same group;
   assigning a unique number to each group of character images;
   storing the locations of the boxes, the text codes of the respective characters and the unique numbers assigned to the groups;
   deleting the groups of character images from the page; and
   compressing the page after the deletion to obtain a compressed document.

4. The method according to claim 1, the method further comprises:
   classifying all characters in the plurality of pages of the scanned book into a plurality of groups using pixel data of the respective characters such that character images with the same visual appearance are assigned to a same group;
   assigning a unique number to each group of character images;
   storing the locations of the rectangular boxes, the text codes of the respective characters and the unique numbers assigned to the groups;
   deleting the groups of character images from the plurality of pages in the scanned book; and
   compressing the plurality of pages after the deletion to obtain a compressed document.

5. The method according to claim 1, wherein segmenting and identifying comprises:
   segmenting and identifying the page image data using Optical Character Recognition.

6. The method according to claim 1, wherein the aggregated character line information comprises at least one of the following: location information of the character line, height information of the character line, or order information of respective characters in the character line.

7. An apparatus for processing a data of a scanned book comprising a plurality of pages, the apparatus comprising:
   a memory device that stores a set of instructions; and
   a processor capable of executing the set of instructions to:
   obtain page image data from a page;
   segment and recognize the page image data to obtain locations of boxes corresponding to respective characters and text codes for the respective characters;
   obtain aggregated character line information for a line of characters;
   determine the height of the line of characters in accordance with the aggregated character line information;
   adjust the box of each character to have the same height as the determined height of the line of characters; and
   adjust the height of the line of characters based on heights of both a previous line and a subsequent line.

8. The apparatus according to claim 7, further comprising a storage device, configured to:
   store the locations of the boxes, the aggregated character line information, and the text codes.

9. The apparatus according to claim 7, wherein the processor is further capable of executing the set of instructions to:
   classify the character images on the page into a plurality of groups using pixel data of the respective characters such that character images with the same visual appearance are assigned to a same group;
   assign a unique number to each group of character images;
   delete the groups of character images from the page; and
   compress the page after the deletion to obtain a compressed document.

10. The apparatus according to claim 7, wherein the processor is further capable of executing the set of instructions to:
    classify characters in the plurality of pages of the scanned book into a plurality of groups using pixel data of the respective characters such that character images with the same visual appearance are assigned to a same group;
    assign a unique number to each group of character images;
    delete the groups of character images from the plurality of pages in the scanned book; and
    compress the plurality of pages after the deletion to obtain a compressed document.

11. The apparatus according to claim 7, wherein the processor is further capable of executing the set of instructions to segment and identify the page image data using Optical Character Recognition.

12. The apparatus according to claim 7, wherein the aggregated character line information comprises at least one of the following: location information of the character line, height information of the character line, or order information of respective characters in the character line.

13. A non-transitory computer-readable storage medium with an executable program stored thereon, wherein the program instructs to perform the following steps:
   obtaining page image data from a page;
   segmenting and recognizing the page image data to obtain locations of boxes corresponding to respective characters and text codes for the respective characters;
   obtaining aggregated character line information for a line of characters; and
   adjusting the boxes in accordance with the obtained aggregated character line information;
   wherein the adjusting comprises:
      determining the height of the line of characters in accordance with the aggregated character line information;
      adjusting the box of each character to have the same height as the determined height of the line of characters; and
      adjusting the height of the line of characters based on heights of both a previous line and a subsequent line.

14. The non-transitory computer-readable storage medium according to claim 13, wherein the aggregated character line information comprises at least one of the following: location information of the character line, height information of the character line, or order information of respective characters in the character line.

* * * * *